(12) United States Patent
Fergus et al.

(10) Patent No.: US 7,194,921 B1
(45) Date of Patent: Mar. 27, 2007

(54) SPEED-SENSING DEVICE AND METHOD FOR ASSEMBLING THE SAME

(75) Inventors: Patrick Martin Fergus, Perrysburg, OH (US); Quang Toan Hang, Perrysburg, OH (US); Scott Eakright, Perrysburg, OH (US)

(73) Assignee: Torque-Traction Technologies, LLC, Maumee, OH (US)

( * ) Notice: Subject to any disclaimer, the term of this patent is extended or adjusted under 35 U.S.C. 154(b) by 84 days.

(21) Appl. No.: 11/111,715

(22) Filed: Apr. 22, 2005

(51) Int. Cl.
*G01L 3/00* (2006.01)

(52) U.S. Cl. .............................. 73/862.328; 73/514.16; 73/514.39

(58) Field of Classification Search ............. 73/514.16, 73/514.39, 862.328
See application file for complete search history.

(56) References Cited

U.S. PATENT DOCUMENTS

| 3,138,970 | A | 6/1964 | Costa et al. |
|---|---|---|---|
| 3,719,841 | A | 3/1973 | Ritsema |
| 3,769,533 | A | 10/1973 | Pauwels |
| 3,949,841 | A | 4/1976 | Jovick et al. |
| 4,090,592 | A | 5/1978 | Jovick et al. |
| 4,953,670 | A | 9/1990 | Chemelewski |
| 5,053,656 | A | 10/1991 | Hodge |
| 5,067,350 | A | 11/1991 | Grillo et al. |
| 5,184,069 | A | 2/1993 | Adler et al. |
| 5,486,757 | A | 1/1996 | Easley |
| 6,238,316 | B1 * | 5/2001 | Sturm ........................ 475/150 |
| 6,511,395 | B1 | 1/2003 | Irwin |
| 6,549,001 | B1 | 4/2003 | Dobbs et al. |
| 6,664,780 | B2 | 12/2003 | Dobbs et al. |
| 2003/0085696 | A1 | 5/2003 | Dobbs et al. |
| 2004/0180747 | A1 * | 9/2004 | Weilant et al. ............... 475/154 |

* cited by examiner

*Primary Examiner*—Edward Lefkowitz
*Assistant Examiner*—Freddie Kirkland, III
(74) *Attorney, Agent, or Firm*—Berenato, White & Stavish

(57) ABSTRACT

A method for assembling a speed-sensing device for monitoring an angular velocity of a rotatable shaft, comprises the steps of: providing a hollow housing having a speed sensor hole, installing a stopper plug into the speed sensor hole so that a stein portion of the stopper plugs extends into the housing, inserting a tone wheel into the housing and inserting the shaft into the housing until the shaft positively engages the tone wheel. The speed-sensing device comprises the tone wheel non-rotatably mounted to the shaft. The shaft has a shaft groove formed on an outer peripheral surface thereof, while the tone wheel has a wheel groove formed on an inner peripheral surface thereof. The speed-sensing device further includes a snap ring retainer provided to engage the complementary shaft and wheel grooves in order to prevent movement of the tone wheel along the shaft.

21 Claims, 2 Drawing Sheets

SPEED-SENSING DEVICE AND METHOD FOR ASSEMBLING THE SAME

BACKGROUND OF THE INVENTION

1. Field of the Invention

The present invention relates to speed-sensing devices in general, and more particularly to a speed-sensing device which use tone wheels.

2. Description of the Prior Art

Vehicle axle assemblies which provide speed-sensing devices associated therewith for antilock braking systems or traction control as examples are well known in the art. In such systems, speed-sensing equipment is conventionally located at the ring-gear flange of the differential assembly or directly affixed to a trunnion extending from and being integral with the ring gear flange. The speed-sensing equipment normally comprises a speed-sensing transducer mounted on an axle shaft so as to face an exciter wheel or tone wheel mounted to an axle housing and provided with a plurality of gear teeth axially aligned with the speed-sensing transducer. Such a system has various disadvantages including complexity of aligning the tone wheel with the speed-sensing transducer and retaining the speed-sensing transducer on the axle shaft.

Thus, the known speed-sensing devices of the vehicle axle assemblies, including but not limited to those discussed above, and methods for assembling thereof, although proven to be acceptable for various vehicular driveline applications, are nevertheless susceptible to improvements that may enhance their performance and cost. With this in mind, a need exists to develop an improved speed-sensing assembly of a vehicle axle apparatus and a method of assembling thereof that advance the art.

SUMMARY OF THE INVENTION

The present invention provides an improved speed-sensing device for monitoring an angular velocity of a rotatable shaft and a method for assembling the same.

The method for assembling the speed-sensing device in accordance with the present invention comprises the steps of: providing a hollow housing having a speed sensor hole, installing a stopper plug into the speed sensor hole so that a stem portion of the stopper plugs extends into the housing, inserting a tone wheel into the housing and inserting the shaft into the housing until the shaft positively engages the tone wheel.

The speed-sensing device in accordance with the present invention comprises the tone wheel non-rotatably mounted to the shaft. The shaft has a shaft groove formed on an outer peripheral surface thereof, while the tone wheel has a wheel groove formed on an inner peripheral surface thereof. The wheel groove is complementary to the shaft groove. The speed-sensing device further includes a snap ring retainer provided to engage the complementary shaft and wheel grooves in order to prevent movement of the tone wheel along the shaft.

Therefore, the speed-sensing device and the method for assembling the speed-sensing device in accordance with the present invention allows simplified engagement and retention of the tone wheel with the rotatable shaft that reduces the cost of assembling the speed-sensing device of a shaft apparatus. Moreover, the present invention allows to package, install and service a large tone wheel inboard of current on-shaft anti-friction bearing.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
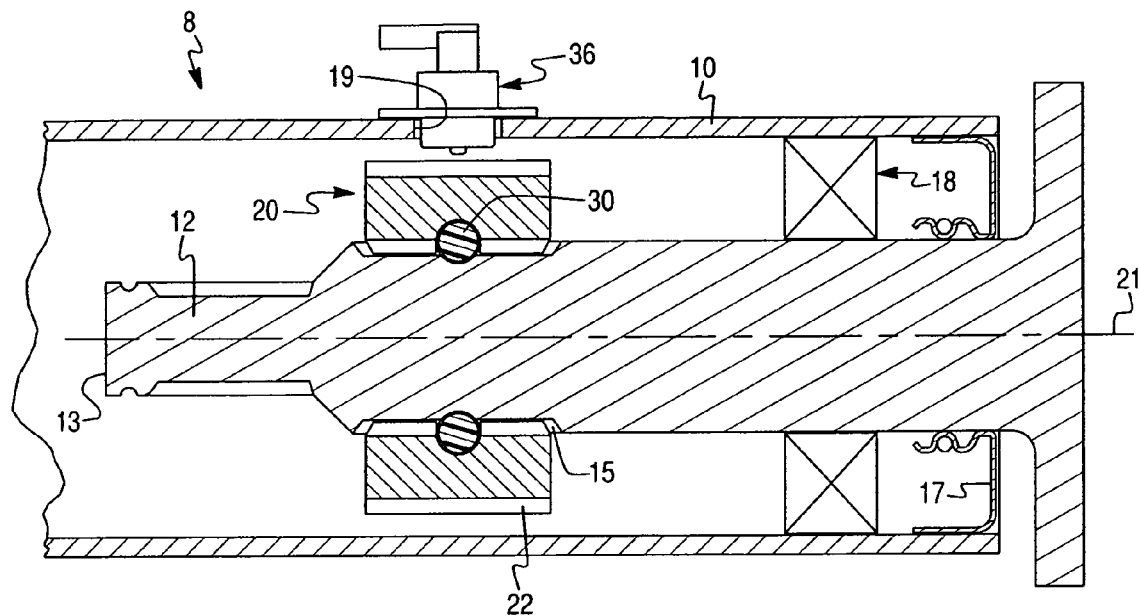
FIG. 1 is a cross-sectional view of a portion of an axle apparatus of a motor vehicle in accordance with a preferred embodiment of the present invention in an assembled condition.

FIG. 1 shows a portion of an axle apparatus 8 of a motor vehicle (not shown).

However, it is to be understood that while the present invention is described in relation to the axle apparatus of the motor vehicle, the present invention is equally suitable for use in other mechanical component including a rotatable shaft and utilizing a speed-sensing device for monitoring an angular velocity of the rotatable shaft.

The axle apparatus 8 includes a hollow axle housing 10 which is supported on the motor vehicle. The hollow axle housing 10 supports an axle shaft 12 therewithin by means of a rolling bearing 18 for rotation about a central axis 21. The axle housing 10 is sealed with an annular lip seal 17 press-fit into a distal end 11 thereof.

The axle shaft 12 has a first set of splines 14 and a second set of splines 15 so that an outer diameter of the second set of splines 15 is larger than an outer diameter of the first set of splines 14. The first set of splines 14 is provided for non-rotatably coupling the axle shaft 12 to a differential mechanism (not shown) of the axle apparatus 8.

The axle apparatus 8 further includes a speed-sensing device for monitoring an angular velocity of the axle shaft 12, ie. a speed of a wheel of the motor vehicle driven by the axle shaft 12. The speed-sensing device includes a tone wheel (or ring) 20 and a speed-sensing transducer 36 positioned adjacent to and radially spaced from the tone wheel 20. The tone wheel 20 is mounted about the axle shaft 12, while the speed-sensing transducer is mounted to the axle housing 10 so as to extend through a corresponding sensor hole 19 machined through the axle housing 10. The tone wheel 20 includes a plurality of uniformly-spaced projections or teeth 22 formed on a substantially cylindrical outer peripheral surface 23 of the tone wheel 20 and a central opening 24 defined by a substantially cylindrical inner peripheral surface 25 thereof.

The inner peripheral surface 25 of the tone wheel 20 is formed with inner splines 26 provided to engage the second set of splines 15 of the axle shaft 12 so as to non-rotatably couple the tone wheel 20 with the axle shaft 12. As illustrated, each of opposite side surfaces 27 of the tone wheel 20 is provided with a slant portion 28 formed adjacent to the central opening 24. Preferably, the teeth 22 and the inner splines 26 are integrally formed on the tone wheel 20. In manufacture of the tone wheel 20, both the teeth 22 and the inner splines 26 may be produced in a single, one-pass manufacturing process conveniently and cost effectively.

When assembled, the speed-sensing transducer is aligned with the tone wheel 20. More specifically, the speed-sensing transducer is positioned adjacent to and radially spaced from the tone wheel 20. The teeth 22 provide a signal generator for the speed-sensing transducer is to allow measurement of the rotational speed of the axle shaft 12 as will be appreciated by those skilled in the art. The speed-sensing transducer is will produce an electrical output supplied to an electronic control circuit (not shown) which is used to control the rotational speed of the axle shaft 12 as desired.

Figure 2:
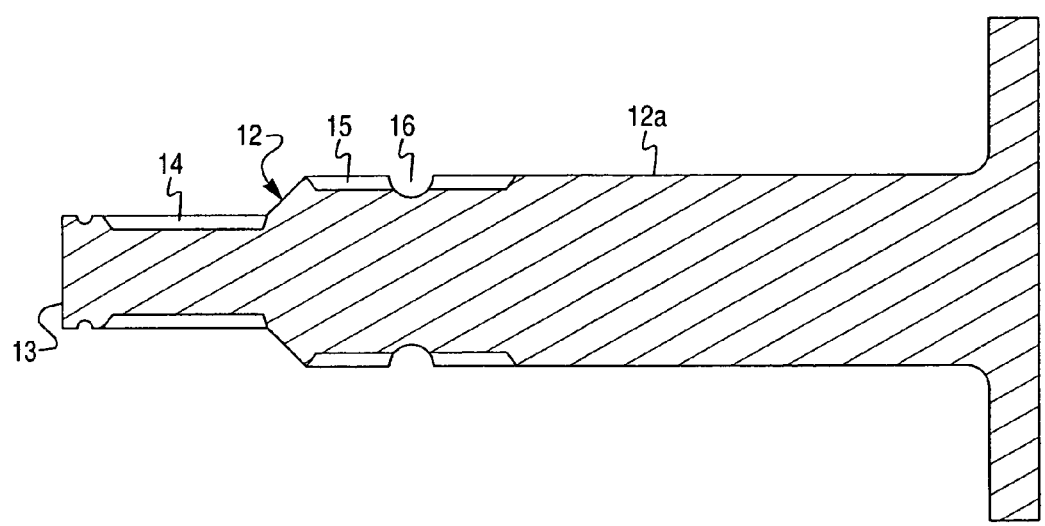
FIG. 2 is a cross-sectional view of an axle shaft in accordance with the preferred embodiment of the present invention.
Figure 3:
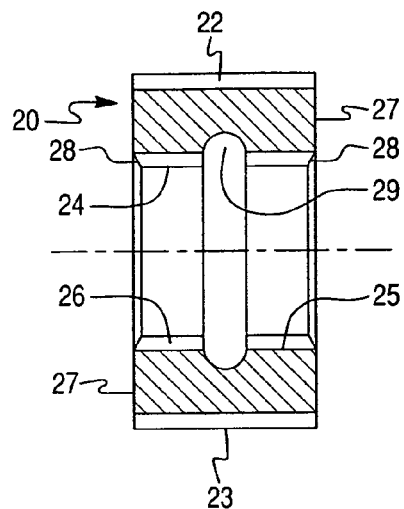
FIG. 3 is a cross-sectional view of a tone wheel in accordance with the preferred embodiment of the present invention.
Figure 4:
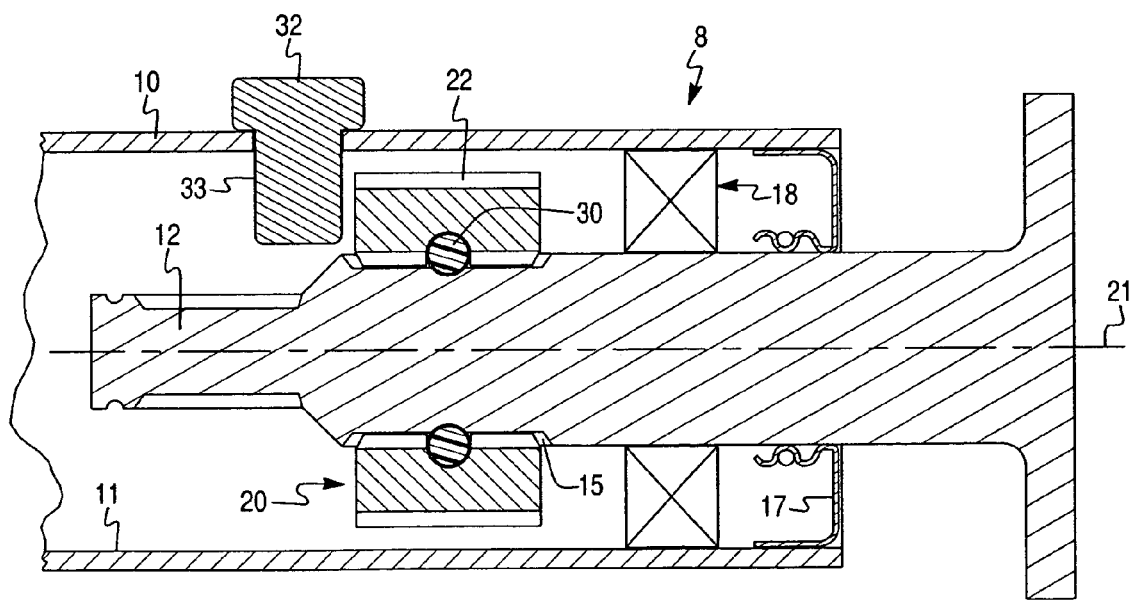
FIG. 4 is a cross-sectional view of the portion of the axle apparatus in accordance with the preferred embodiment of the present invention in a partially assembled condition.

As illustrated in detail in FIG. 2, the axle shaft 12 has a substantially annular radially outwardly facing shaft groove 16 formed on an outer peripheral surface 12a thereof and the tone wheel 20 includes a substantially annular radially inwardly facing wheel groove 29 formed on the inner peripheral surface 25 thereof. More specifically, the shaft groove 16 is formed on a portion of the outer peripheral surface 12a of the axle shaft 12 which is provided with the second set of splines 15. The axle groove 16 is complementary to the wheel groove 29. As illustrated, the wheel groove 29 is axially spaced from the opposite side surfaces 27 of the tone wheel 20. The tone wheel 20 is mounted on the axle shaft 12 and retained thereon by a flexible snap ring retainer 30 (such as a split ring) positionable to occupy both the shaft groove 16 of the axle shaft 12 and the wheel groove 29 of the tone wheel 20. Thus, the snap ring retainer 30 prevents axial movement of the tone wheel 20 along the axis 21 of the axle shaft 12.

A method for assembling the speed-sensing device of the axle apparatus 8 according to the preferred embodiment of the present invention is performed in the following manner.

First, the axle housing 10 formed with the sensor hole 19 is provided, and a stopper plug 32 is installed in the sensor hole 19. The stopper plug 32 has a retainer stem portion 33 extending into the axle housing 10.

Then, the snap ring retainer 30 is mounted into the wheel groove 29 in the tone wheel 20 and the tone wheel 20 is inserted into the axle assembly 10 through an access opening in the axle housing 10 at the distal end 11 thereof. The tone wheel 20 is driven into the axle housing 10 until the tone wheel 20 contacts the retainer stem portion 33 of the stopper plug 32, thus preventing further movement of the tone wheel 20 in the axle housing 10 further away from the distal end 11 thereof.

Next, the rolling bearing 18 and the annular lip seal 17 press-fit into the distal end 11 of the axle housing 10. Subsequently, the axle shaft 12 is introduced into the axle housing 10 so as to insert an inward end 13 of the axle shaft 12 into the central opening 24 in the tone wheel 20. As the axle shaft 12 is pushed through the tone wheel 20, the splines 15 of the axle shaft 12 mate with the splines 26 of the tone wheel 20, thus non-rotatably coupling the tone wheel 20 to the axle shaft 12. Furthermore, as the axle shaft 12 is further pushed through the tone wheel 20, the snap ring retainer 30 snaps into the shaft groove 16 of the axle shaft 12, thus retaining the tone wheel 20 on the axle shaft 12 in the axial direction along the axle shaft 12. Therefore, the axle shaft 12 positively engages the tone wheel 20 to prevent movement of the tone wheel 20 relative to the axle shaft 12 in both angular and axial directions.

After the axle shaft 12 positively engages the tone wheel 20, the stopper plug 32 is removed from the speed sensor hole 19 in the axle housing 10. Then, the axle shaft 12 is further inserted into the axle housing 10 so as to align the tone wheel 20 with the speed sensor hole 19. Finally, the speed-sensing transducer 36 is mounted to the axle housing 10 through the speed sensor hole 19. Alternatively, the speed-sensing transducer 36 could be mounted to the axle housing 10 prior to the step of aligning the one wheel 20 with the speed-sensing transducer 36 or the speed sensor hole 19.

Therefore, the axle apparatus and the method for assembling the axle apparatus in accordance with the present invention allows simplified engagement and retention of the tone wheel with the axle shaft that reduces the cost of assembling the speed-sensing device of the axle apparatus. Moreover, the present invention allows to package, install and service a large tone wheel inboard of current on-shaft wheel bearing.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for assembling a speed-sensing device for monitoring an angular velocity of a rotatable shaft, said method comprising the steps of:
   providing a hollow housing having a speed sensor hole;
   installing a stopper plug into said speed sensor hole so that a stem portion of said stopper plug extends into said housing;
   inserting a tone wheel into said housing; and
   inserting said shaft into said housing until said shaft positively engages said tone wheel.

2. The method as defined in claim 1, further including the step of removing said stopper plug from said speed sensor hole subsequent to the step of positively engaging said tone wheel by said shaft.

3. The method as defined in claim 2, further including the step of inserting said shaft further into said housing so as to align said tone wheel with said speed sensor hole subsequent to the step of removing said stopper plug.

4. The method as defined in claim 2, further including the step of mounting a speed sensor to said housing through said speed sensor hole subsequent to the step of removing said stopper plug.

5. The method as defined in claim 1, wherein said tone wheel is positively engaged by said shaft through a spline connection for non-rotatably coupling said shaft to said tone wheel.

6. The method as defined in claim 1, wherein said tone wheel is positively engaged by said shaft through a snap ring retainer disposed in opposite circumferential grooves formed in said shaft and said tone wheel.

7. The method as defined in claim 6, wherein said groove formed in said tone wheel is axially spaced from opposite side surfaces of said tone wheel.

8. The method as defined in claim 6, wherein one of said grooves is formed on an outer peripheral surface of said shaft and the other of said grooves is formed on an inner peripheral surface of said tone wheel.

9. The method as defined in claim 6, further including the step of mounting said snap ring retainer into said groove in said tone wheel prior to the step of inserting said tone wheel into said housing.

10. The method as defined in claim 9, wherein the step of inserting said shaft into said housing until said shaft positively engages said tone wheel includes the step of inserting said shaft into said tone wheel until said snap ring retainer snaps into said groove in said shaft.

11. The method as defined in claim 1, wherein said tone wheel is inserted into said housing until said tone wheel contacts said stopper plug.

12. The method as defined in claim 1, wherein said hollow housing is an axle housing of an axle apparatus of a motor vehicle.

13. The method as defined in claim 1, wherein step of inserting said shaft into said housing includes the step of inserting said shaft into a central opening in said tone wheel subsequent to the step of inserting said tone wheel into said housing.

14. A method for assembling an axle apparatus of a motor vehicle, said method comprising the steps of:
   providing a hollow axle housing having a speed sensor hole;
   installing a stopper plug into said speed sensor hole so that a stem portion of said stopper plug extends into said axle housing;
   inserting a tone wheel into said axle housing until said tone wheel contacts said stopper plug;
   inserting an axle shaft into said axle housing until said axle shaft positively engages said tone wheel;
   removing said stopper plug from said speed sensor hole;
   inserting said shaft further into said housing so as to align said tone wheel with said speed sensor hole; and
   mounting a speed sensor to said housing through said speed sensor hole.

15. A speed-sensing device for monitoring an angular velocity of a rotatable shaft, said speed-sensing device comprising:
   a hollow housing;
   a shaft rotatably disposed within said housing, said shaft having a shaft groove formed on an outer peripheral surface thereof;
   a tone wheel non-rotatably mounted to said shaft, said tone wheel having a wheel groove formed on an inner peripheral surface thereof, said wheel groove being complementary to said shaft groove; and
   a snap ring retainer disposed between said inner peripheral surface of said tone wheel and said outer peripheral surface of said axle shaft so as to engage said complementary shaft and wheel grooves in order to prevent movement of said tone wheel along said shaft.

16. The speed-sensing device as defined in claim 15, wherein said tone wheel is positively engaged by said shaft through a spline connection for non-rotatably coupling said shaft to said tone wheel.

17. The speed-sensing device as defined in claim 16, wherein said shaft groove is formed on a portion of said outer peripheral surface of said shaft provided with splines engaging corresponding splines formed on said inner peripheral surface of said tone wheel.

18. The speed-sensing device as defined in claim 15, wherein said groove formed in said tone wheel is axially spaced from opposite side surfaces of said tone wheel.

19. The speed-sensing device as defined in claim 15, wherein said hollow housing is an axle housing of an axle apparatus of a motor vehicle.

20. The speed-sensing device as defined in claim 19, wherein said shaft is an axle shaft rotatably disposed within said axle housing, said axle shaft having a set of splines and a shaft groove formed on an outer peripheral surface thereof;
   wherein said tone wheel is non-rotatably mounted to said axle shaft, said tone wheel has a set of splines and a wheel groove formed on an inner peripheral surface thereof, said wheel groove is axially spaced from opposite side surfaces of said tone wheel, said wheel groove being complementary to said shaft groove; and
   wherein said snap ring retainer is disposed between said inner peripheral surface of said tone wheel and said outer peripheral surface of said axle shaft so as to engage said complementary axle and wheel grooves in order to prevent movement of said tone wheel along said axle shaft; said splines of said tone wheel engage said splines of said axle shaft.

21. The speed-sensing device as defined in claim 15, wherein said shaft groove is formed circumferentially on said outer peripheral surface of said shaft and said wheel groove is formed circumferentially on said inner peripheral surface of said tone wheel.

\* \* \* \* \*